(12) United States Patent
Meijer et al.

(10) Patent No.: US 7,899,840 B2
(45) Date of Patent: Mar. 1, 2011

(54) GROUP JOINS TO NAVIGATE DATA RELATIONSHIPS

(75) Inventors: Henricus Johannes Maria Meijer, Mercer Island, WA (US); Anders Hejlsberg, Seattle, WA (US); Dinesh Chandrakant Kulkarni, Sammamish, WA (US); Matthew J. Warren, Redmond, WA (US); Mads Torgersen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 380 days.

(21) Appl. No.: 11/693,136

(22) Filed: Mar. 29, 2007

(65) Prior Publication Data

US 2008/0243764 A1    Oct. 2, 2008

(51) Int. Cl.
 *G06F 7/00* (2006.01)
 *G06F 17/30* (2006.01)
(52) U.S. Cl. .................. 707/769; 707/774; 707/722
(58) Field of Classification Search ............... 707/3, 707/769, 770, 999.001–999.005
 See application file for complete search history.

(56) References Cited

U.S. PATENT DOCUMENTS

| 4,429,385 A | 1/1984 | Cichelli et al. | |
|---|---|---|---|
| 5,412,804 A * | 5/1995 | Krishna | 707/999.002 |
| 5,724,577 A | 3/1998 | Exley et al. | |
| 5,974,407 A | 10/1999 | Sacks | |
| 6,189,012 B1 | 2/2001 | Mital et al. | |
| 6,253,197 B1 | 6/2001 | Lindsay et al. | |
| 6,263,331 B1 | 7/2001 | Liu et al. | |
| 6,438,541 B1 * | 8/2002 | Witkowski | 707/714 |
| 6,640,221 B1 * | 10/2003 | Levine et al. | 707/999.003 |
| 6,834,279 B1 | 12/2004 | Chiang | |
| 6,898,593 B1 | 5/2005 | Mulukutla et al. | |
| 6,957,222 B1 | 10/2005 | Ramesh | |
| 7,099,887 B2 | 8/2006 | Hoth et al. | |
| 2002/0127529 A1 * | 9/2002 | Cassuto et al. | 434/335 |
| 2005/0004896 A1 * | 1/2005 | Cseri et al. | 707/3 |
| 2005/0097084 A1 * | 5/2005 | Balmin et al. | 707/3 |
| 2006/0074901 A1 * | 4/2006 | Pirahesh et al. | 707/5 |
| 2006/0173813 A1 | 8/2006 | Zorola | |
| 2007/0130110 A1 * | 6/2007 | Graefe et al. | 707/2 |

OTHER PUBLICATIONS

Meijer et al., "Overview of Visual Basic 9.0", Sep. 2005, Microsoft Corp., pp. 1-18.*
Jiawei Han, et al. "Join index hierarchy: an indexing structure for efficient navigation in object-oriented Databases," IEEE Transactions on Knowledge and Data Engineering, vol. 11, No. 2, Mar./Apr. 1999, http://ieeexplore.ieee.org/iel4/69/16480/00761666.pdf?isNumber= last accessed Nov. 13, 2006, 17 pages.
Charles Bontempo, et al. "The IBM Data Warehouse Architecture" http://delivery.acm.org/10.1145/290000/285078/p38-bontempo.pdf?key1=285078&key2=9842243611&coll=GUIDE&dl=GUIDE&CFID=4439597&CFTOKEN=49876491 Mar. 2000, last accessed Nov. 13, 2006, 11 pages.
Ionel D. Stroe, et al. "Scalable Visual Hierarchy Exploration", http://davis.wIONEL D. Stroe, et al. pi.edu/dsrg/XMDV/tr00-06.ps.gz. Mar. 2000. Last accessed Nov. 13, 2006, 28 pages.

* cited by examiner

*Primary Examiner*—Mohammad Ali
*Assistant Examiner*—Kannan Shanmugasundaram
(74) *Attorney, Agent, or Firm*—Workman Nydegger

(57) ABSTRACT

A group join query facilitates navigation of relationships (e.g., one-to-many or many-to-one) across a plurality of data collections. Such a query operator produces nested or hierarchical results that capture the arguments passed thereto. If desired, the nested results can be flattened to simulate conventional relational database results.

18 Claims, 10 Drawing Sheets

GROUP JOINS TO NAVIGATE DATA RELATIONSHIPS

BACKGROUND

A database management system (DBMS) facilitates interaction with database data. The DBMS efficiently manages requests or queries from users and programs so that these entities are free from having to know specifics pertaining to how and where data is physically stored. Furthermore, in handling requests, the DBMS ensures data integrity and security. Although other systems are emerging, the relational database management system (RDBMS) remains the most common DBMS.

A relational database is one with that conforms to a relational data model or schema. Relations are captured in databases of this type by a number of tables comprising one or more rows and columns representing records and fields respectively. Data values are stored at the intersection of rows and columns. Each row represents a unique record of data from one or more columns, which enforce particular data types on values thereof.

Relationships between tables are expressed utilizing data values representing primary and foreign keys. A primary key is at least one column uniquely identifying a row in a table. A foreign key is one or more table columns whose values are the same as those of a primary key from another table. Relationships are expressed between tables by matching foreign keys in tables to primary keys of other tables.

A structured query language (SQL) is the standard computer language for relational database interaction. SQL is a set-based declarative language designed specifically for creating, retrieving, updating and deleting relational data. Standard commands such as "Select," "Update," "Delete," "Create," "Drop" and variations thereon can be utilized to accomplish most any database task. For example, to retrieve data from a table the following SQL syntax can be specified: "SELECT column_name(s) FROM table_name." The result is a table of rows from the identified table including designated column names.

While data can be retrieved from a single table, many situations require data housed in multiple tables. To obtain data across tables a join needs to be employed to combine rows of various tables. There are a number of different types of joins supported by SQL. The most common join (often the default) is what is referred to as an inner join. An inner join returns all rows from multiple tables where a join condition is satisfied. In essence, an inner join finds the intersection between tables. It is noted that care needs to be taken when using an inner join because rows that include no values or the null value will not be returned, as they will not likely match a join condition.

Another type of join is outer join including further subtypes left and right. In general, an outer join returns all rows from one table (e.g., left, right) and only those rows from other tables that match a join condition. Accordingly, every row will be returned from one table and if there is no matching row in the other table, null will be specified for corresponding columns.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to navigation of relationships across a plurality of data collections. More particularly, a group join operator and associated mechanisms are provided to facilitate traversal of one-to-many or other data relationships. Results of a group join query can be nested or hierarchical rather than flat. However, mechanisms are also provided to flatten such nested results if desired as well as to implement conventional joins (e.g. inner, outer . . . ) as a subset of a group join.

In accordance with one embodiment, a group join query can be identified with respect to a query of at least two data collections, perhaps from an abbreviated query syntax. The identified collections can subsequently be traversed to locate elements that satisfy query arguments. For instance, a nested query or more efficient hash join can be employed to facilitate relation navigation. Matching results can be returned or otherwise exposed in a nested or hierarchical form.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are provided hereinafter that relate to traversal of relationships amongst data collections (e.g., one-to-many or many-to-one). More specifically, a group join operator is provided to navigate relationships in accordance with specified arguments and expose a nested or hierarchical result that has no equivalent in traditional relational database terms. The group join operator is a superset of inner and outer joins. As a result, conventional joins types are supported by a single operator including optionally flattening a nested result. A simplified query syntax is also made available for the group join operator to facilitate specification thereof.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
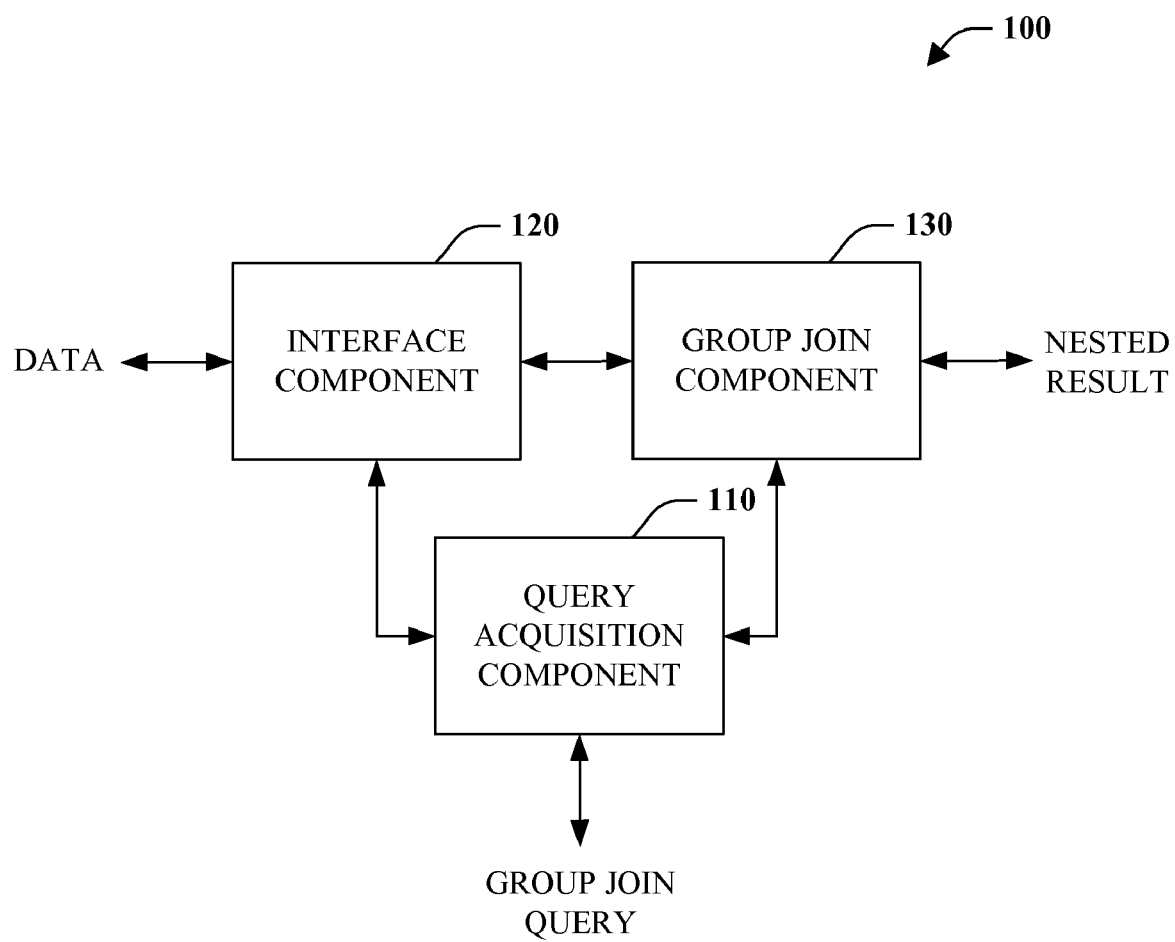
FIG. 1 is a block diagram of data retrieval system.

Referring initially to FIG. 1, a data retrieval system 100 is illustrated in accordance with an aspect of this disclosure. The system 100 enables navigation of relationships across a plurality of data collections and provides access to nested or hierarchical results, among other things. Such data navigation and/or retrieval functionality can be invoked with a special join operator herein referred to as a group join.

Query acquisition component 110 retrieves, receives and/or otherwise identifies a group join query. A group join query is a query operator that facilitates traversal of two or more data collections or sequences. As will be described further infra, such a query can be identified or inferred from a particular query syntax (e.g. "GroupJoin," "join . . . into" . . . ). An acquired group join query and associated arguments can be provided to or otherwise made accessible to one or both of interface component 120 and group join component 130.

The interface component 120 facilitates receipt and/or retrieval of data as well as provisioning of such data to other components. Based on group join arguments, data from one or more specified data collections or sequences can be made available to the group join component 130 automatically or upon request. In accordance with one embodiment, the collections can be specified in accordance with a nested or hierarchical data model; however, the claimed subject matter is applicable to other models as well. Data can be collected and afforded to the group join component 130 from memory and/or a variety of internal and/or external sources.

The group join component 130 joins specified data collections and returns or otherwise makes accessible a nested or hierarchical result. In one instance, data collections are combined as a function of matching keys extracted from elements thereof. The results can be an enumerable object that satisfies arguments passed to an associated group join query. This object can include results in a nested or hierarchical form for which there is no direct equivalent in conventional relational database terms. The group join component 130 can employ a nested query or hash join to combine data elements across collections, among other mechanisms.

By way of example and not limitation, consider a group join query that joins customers with their orders. The group join component 130 could execute this query in a nested fashion such as:

from c in customers select new {c, orders=from o in orders where o.cid=c.id}

Here, the group join component 130 computes for each customer the list of orders related to that customer, which is empty for customers with no orders. However, this query basically amounts to a nested loop. For each customer, all orders are traversed to enable identification of matching orders. More specifically, for the first customer, all orders are looped through and orders that belong to that customer are collected. Next, a second customer is identified, the orders collection is traversed again, orders are selected that belong to the second customer, and so forth. A hash join can enable a group join to be performed more efficiently than utilizing a nested query.

Figure 2:
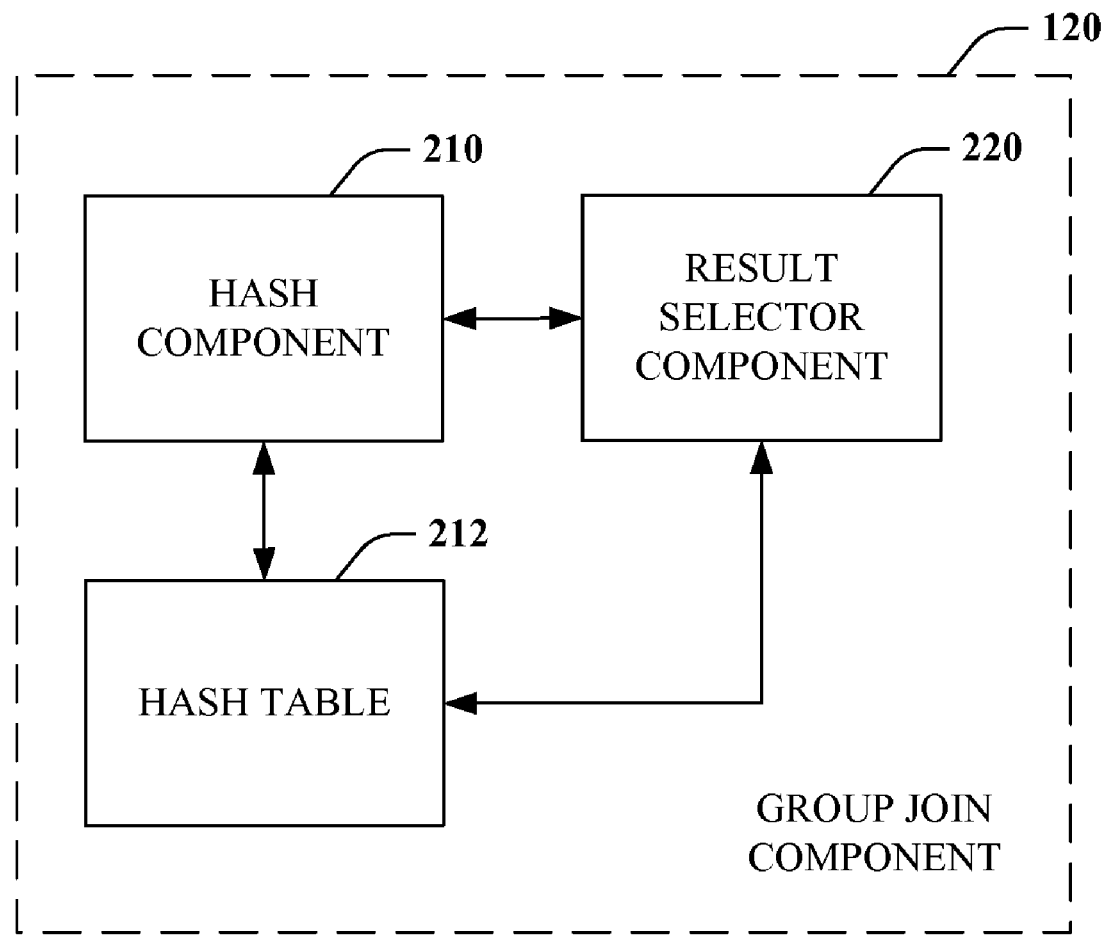
FIG. 2 is a block diagram of a representative group join component that implements a hash join.

Turning to FIG. 2 a representative group join component 130 is shown with mechanisms for implementation of a hash join. A group join can perform a join of two sequences based on matching keys extracted from elements thereof. For purposes of clarity and understanding, the two sequences are identified as inner and outer, which are relative to query specification. In the previous example, "customers" is the outer sequence and "orders" is the inner sequence. A hash component 210 can be employed to execute a hash function over join keys of both the inner and the outer sequences.

In one particular implementation, the hash component 210 can hash the inner sequence and create hash table 212. In the ongoing example, orders can be captured in a hash table as a function of their customer id (c.id). The result selector component 220 can then enumerate the outer sequence and utilize the hash component 210 to look up the identity of associated orders in the hash table 212. In the example, the customer id can be hashed and utilized to locate each customer order(s).

For further clarity and not limitation, consider Tables A-C below representative of a customer collection, an order collection and a hash table, respectively.

TABLE A

| Customers | |
| --- | --- |
| CustomerID | Name |
| 1 | John |
| 2 | Adam |
| 3 | Melissa |
| 4 | Tom |

TABLE B

| Orders | | |
| --- | --- | --- |
| OrderID | Order | CustomerID |
| 10 | Book | 1 |
| 11 | Wallet | 3 |
| 12 | Purse | 3 |
| 13 | Book | 2 |
| 14 | Movie | 1 |

TABLE C

| Hash Table | |
| --- | --- |
| HashID | Order(s) |
| 0 | |
| 1 | |
| 2 | Book, Movie |
| 3 | |
| 4 | Book |
| 5 | |
| 6 | Wallet, Purse |
| 7 | |
| 8 | |

The customers collection includes a CustomerID as primary key and a name of each customer. The orders collection includes an OrderID as primary key, the actual order and CustomerID as foreign key. The hash table is comprised of a HashID and a set or sequence of orders. The hash table is populated with orders for particular customers identified in the orders collection (inner). For simplicity, the hash function is the CustomerID multiplied by two. The result component 220 can then employ the hash component 210 over the customers collection to identify matching orders. More specifically, the CustomerID is hashed to produce a hash key that is employed to look up orders in the hash table. The results would be:

John={Book, Movie}

Adam={Book}

Melissa={Wallet, Purse}

Tom={ }

Note the exemplary nesting of the results. Outer elements are paired with sequences of orders. This is quite different from conventional relational database results for the same query presented below in Table D.

TABLE D

Conventional Results

| Customer | Order |
|---|---|
| John | Book |
| John | Movie |
| Adam | Book |
| Melissa | Wallet |
| Melissa | Purse |

In this one-to-many relationship, the "one" side is duplicated for each "many" side. However, the underlying intention is to produce an actual representation of a one-to-many association as some combination of a source and collection of target values instead of the source value repeated for each associated target value. Furthermore, conventionally a special join would need to be executed such as an outer join to retrieve a customer without an order, in this example "Tom." In accordance with one embodiment, a standard group join can simply return an empty set associated with an element.

More formally, the hash group join described supra can be represented by the following exemplary code signature:

```
public static IEnumerable<TResult> GroupJoin<TOuter, TInner, TKey, TResult>(
    this IEnumerable<TOuter> outer,
    IEnumerable<TInner> inner,
    Func<TOuter, TKey> outerKeySelector,
    Func<TInner, TKey> innerKeySelector,
    Func<TOuter, IEnumerable<TInner>, TResult> resultSelector);
```

In accordance with the signature, the GroupJoin operator allocates and returns an enumerable object that captures the arguments passed to the operator. An exception can be thrown if any argument is null. The outerKeySelector and innerKeySelector arguments specify functions that extract join key values from elements of the outer and inner sequences, respectively. The resultSelector argument specifies a function that creates a result from an outer sequence element and its matching inner sequence elements.

When the object returned by GroupJoin is enumerated, it first enumerates the inner sequence and evaluates the innerKeySelector function once for each inner element, collecting the elements by their keys in a hash table. Once all inner elements and keys have been collected, the outer sequence is enumerated. For each outer element, the outerKeySelector function is evaluated, the resulting key is used to look up the corresponding inner elements in the hash table, the resultSelector function is evaluated for the outer element and the (possibly empty) sequence of matching inner elements, and the resulting object is yielded. In accordance with an embodiment, the GroupJoin operator can preserve the order of the outer sequence elements, and for each outer element, the order of the matching inner sequence elements.

This interface with the hash join is significant as it provides access to a nested result built up by such a hashing process. In traditional relational databases, the type system or language (SQL) does not allow programmers to access nested data. This is one advantage of using an object-oriented language to phrase such query operators. The operators are much more expressive because the structure is richer, among other things.

It is also to be noted that while the aforementioned signature is presented with respect to collections of objects in memory (e.g., IEnumerable), the appended claims are not limited thereto. By way of example, the signature can additionally or alternatively be defined with respect to external collections (e.g., IQueryable). In the external case, expression trees or the like can be built to represent a query and then compiled or translated to run on a database, for instance. The signature can be similar to the above, for example:

```
public static IQueryable<TResult> GroupJoin<TOuter,TInner,TKey, TResult>(
    this IQueryable<TOuter> outer, IQueryable<TInner> inner,
    Expression<Func<TOuter,TKey>> outerKeySelector,
    Expression<Func<TInner,TKey>> innerKeySelector,
    Expression<Func<TOuter,IEnumerable<TInner>,TResult>>
    resultSelector);
```

Instead of IEnumerable this signature takes IQueryable and rather than functions there are expressions of functions. In this manner, the group join can be executed remotely. Further, it can be run or compiled in various ways to underlying system joins.

Figure 3:
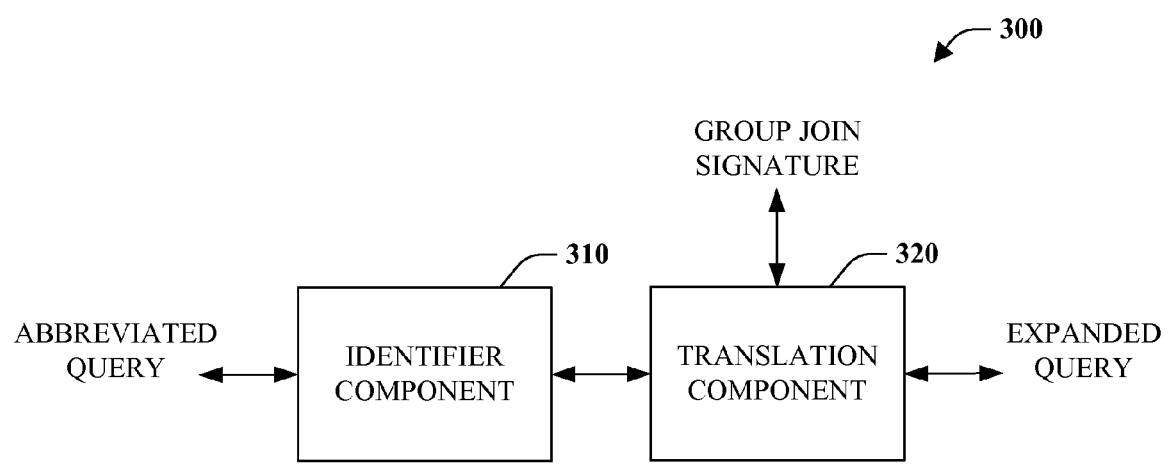
FIG. 3 is a block diagram of a query transformation system.

Turning attention to FIG. 3, a query transformation system 300 is depicted. The query transformation system enables a simplified and/or alternative manner of group join specification. For example, in accordance with the previously presented hash join signature a group join of customers with their orders, producing a pair of tuples with customer name and total of all orders can be specified in a language integrated query as:

```
var custTotalOrders =
    customers.
        GroupJoin(orders, c => c.CustomerID, o => o.CustomerID,
            (c, co) => new { c.Name, TotalOrders = co.Sum(o => o.Total) }
    );
```

Here, customers and orders are specified as collections over which a group join is performed. Also specified are the key selectors. In particular, it is noted that the keys are customer id from customers (c=>c.CustomerID) and customer id from orders (o=>o.CustomerID). Also provided is the result function that given a customer and a collection of orders creates results. This is denoted here as: (c, co)=>new {c.Name, TotalOrders=co.Sum(o=>o.Total)}. This code includes a lot redundant and/or boilerplate code that can be simplified to expediate program specification and comprehension, inter alia. By way of example and not limitation, consider the following abbreviated code syntax equivalent to the above snippet:

```
var custTotalOrders =
    from c in customers
    join o in orders on c.CustomerID equals o.CustomerID into co
    select new { c.Name, TotalOrders = co.Sum(o => o.Total) };
```

The "join . . . equal . . . into" syntax calls the group join operator in a more concise and intuitive manner. For example, some of the awkward arrows (=>) are eliminated with respect to key selector identification. The join is also structured to resemble a SQL "select . . . from . . . where" query, wherein "select new {c.Name, TotalOrders=co.Sum(o=>o.Total)}" corresponds to the select portion, "from c in customers" corresponds to the from segment, and "join o in orders on c.CustomerID equals o.CustomerID into co" corresponds to the where part.

To deal with such a shorted syntax, the system 300 includes an identifier component 310 and a translation component 320. The identifier component 310 can discover, recognize and/or identify an abbreviated query, for instance as in the example provided above. The translation component 320 can receive or retrieve identification of such code or the code itself from the identifier code 310. The abbreviated code can then be translated or transformed into an expanded format by the translation component 320. In particular, the component 320 can receive or include knowledge of a supported join signature, which it can utilized to transform an abbreviated query. The functionality of system 300 can be embodied in an interpreter, compiler or similar component.

It is to be appreciated that code can be abbreviated in plurality of manners as long as it can be translated into an appropriate expanded form. For example, the previous syntax utilizes the token "equals" to separate and facilitate identification of key selectors. Arguments on the right side of the "equals" correspond to an order key (inner) and arguments on the left correspond to a customer key (outer), for instance. "Equals" was chosen as a keyword rather than the equal sign ("=") or double equal ("==") as is conventionally done to indicate that the equality is between key selector values not a true equality. Otherwise, individuals might expect that they can utilize other comparative expressions here such as less than ("<") or greater than (">"). However, conventional keywords or any other representation can be employed as long as the translation component 320 is able to determine or otherwise infer key selectors.

Figure 4:
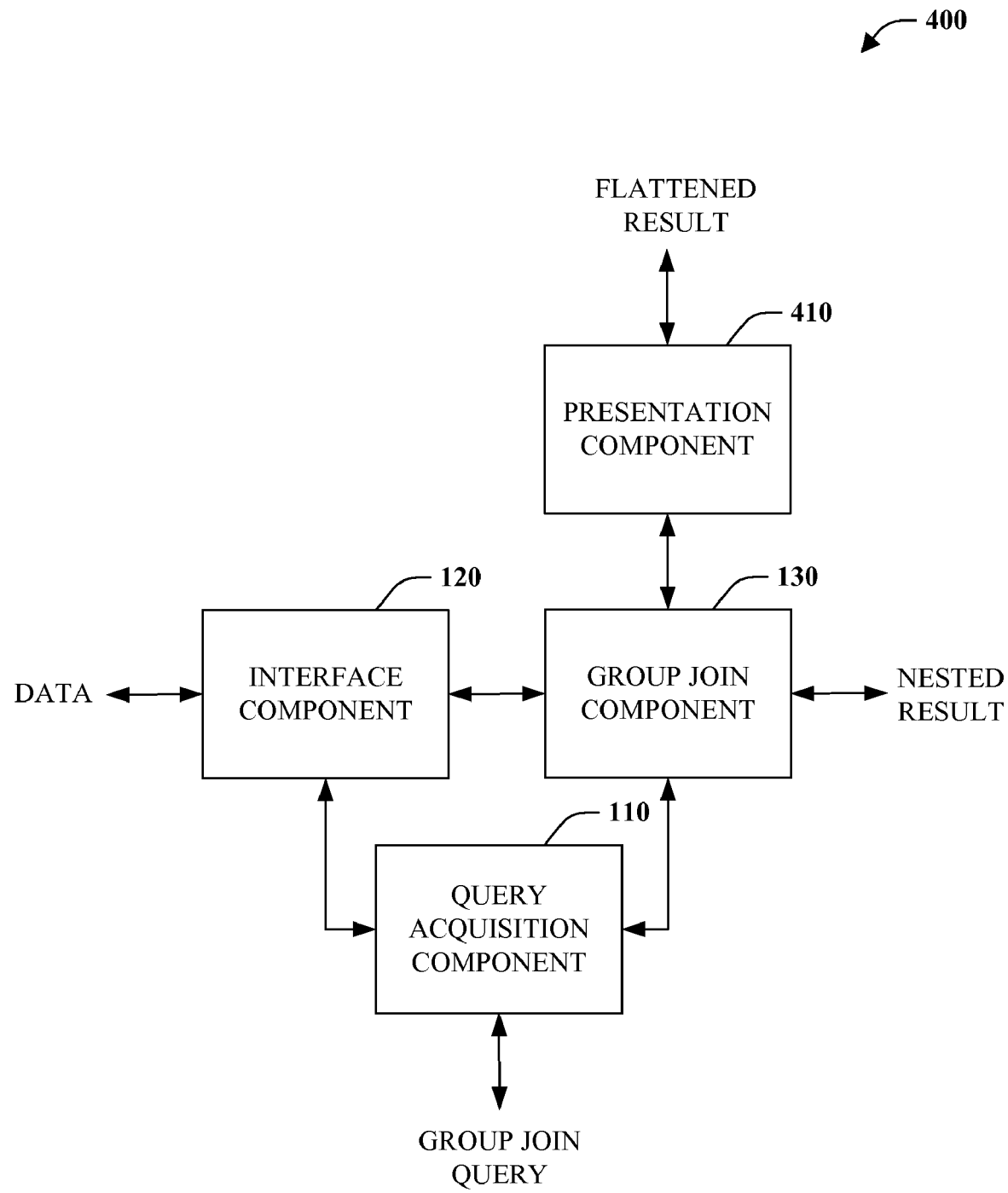
FIG. 4 is a block diagram of a data retrieval system with modified result presentation functionality.

Referring to FIG. 4, a data retrieval system 400 is depicted in accordance with an aspect of the disclosure. Similar to system 100 of FIG. 1, system 400 includes the query acquisition component 110, interface component 120 and group join component 130, as previously described. In brief, the query acquisition component 110 can receive, retrieve or identify a group join query and provided it to one or both of the interface component 120 and the group join component 130 that facilitate data retrieval in accordance with query arguments. The retrieved data can be afforded in a nested or hierarchical format. The system 400 also includes presentation component 410 communicatively coupled to the group join component 130. The presentation component 410 provides a mechanism to return flattened data, such as that conventionally supplied. For example, in a one-to-many association (or alternatively many-to-one association) the presentation component 410 can provision source data repeated for each associated target value rather than a source with a collection of target values. Additionally, the presentation component 410 can insert special characters including without limitation "null" or other empty set operator. In one instance, this can be accomplished via insertion of another query or portion thereof including optional operator to inject values (e.g., null) for missing values.

It is to be appreciated that in accordance with an aspect of the claimed subject matter, a group join operator can implement a superset of inner joins and left outer joins—both can be written in terms of grouped joins. For example, the inner join

```
var custTotalOrders =
    from c in customers
    join o in orders on c.CustomerID equals o.CustomerID
    select new { c.Name, o.OrderDate, o.Total };
``` can be written as a group join followed by an iteration of the grouped orders:

```
var custTotalOrders =
    from c in customers
    join o in orders on c.CustomerID equals o.CustomerID into co
    from o in co
    select new { c.Name, o.OrderDate, o.Total };
```

Further, the query can be turned into a left outer join by applying a "DefaultIfEmpty" operator to the grouped orders as follows:

```
var custTotalOrders =
    from c in customers
    join o in orders on c.CustomerID equals o.CustomerID into co
    from o in co.DefaultIfEmpty(emptyOrder)
    select new { c.Name, o.OrderDate, o.Total };
```

Here, the "emptyOrder" parameter is an "Order" instance used to represent a missing order.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, such mechanisms can be employed by the translation component 320 to allow abbreviated query syntax to be identified and expanded.

In view of the exemplary systems described supra, methodologies that may be implemented in accordance with the disclosed subject matter will be better appreciated with reference to the flow charts of FIGS. 5-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 5:
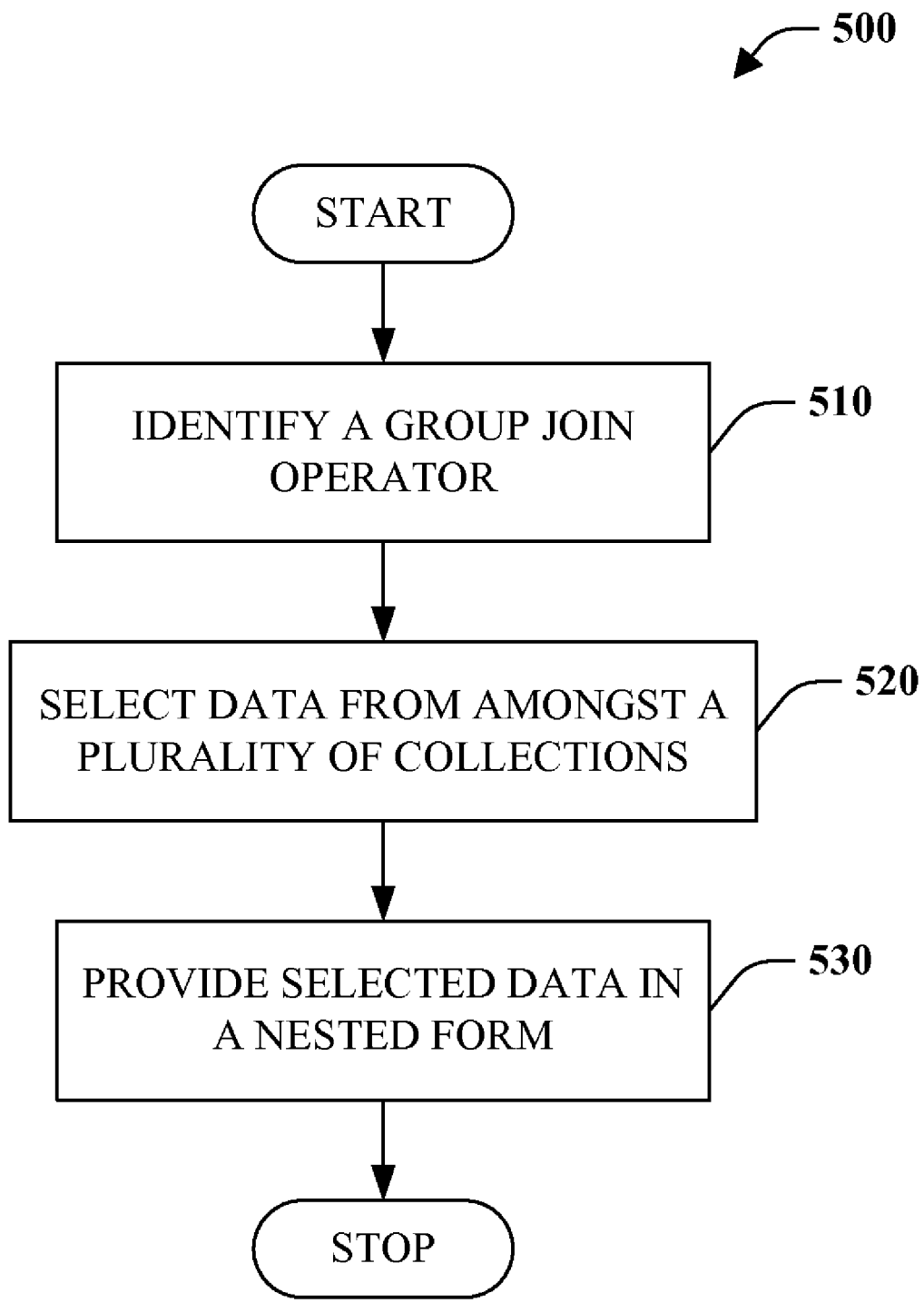
FIG. 5 is a flow chart diagram of a method for retrieving nested data from amongst a plurality of data collections.

Referring to FIG. 5, a data retrieval method 500 is illustrated. At reference numeral 510, a group join operator is identified. Data is selected amongst a plurality of collections at numeral 520 in accordance with an identified group join operator and associated arguments. For example, one-to-many or many-to-one data collections can be navigated. Additionally or alternatively, data can be selected from nested data or data types. At reference numeral 530, results can be provided in a nested or hierarchical format. As described supra, it is to be noted that these nested results can be utilized or transformed into another format such a flat table format returned by conventional database systems.

Figure 6:
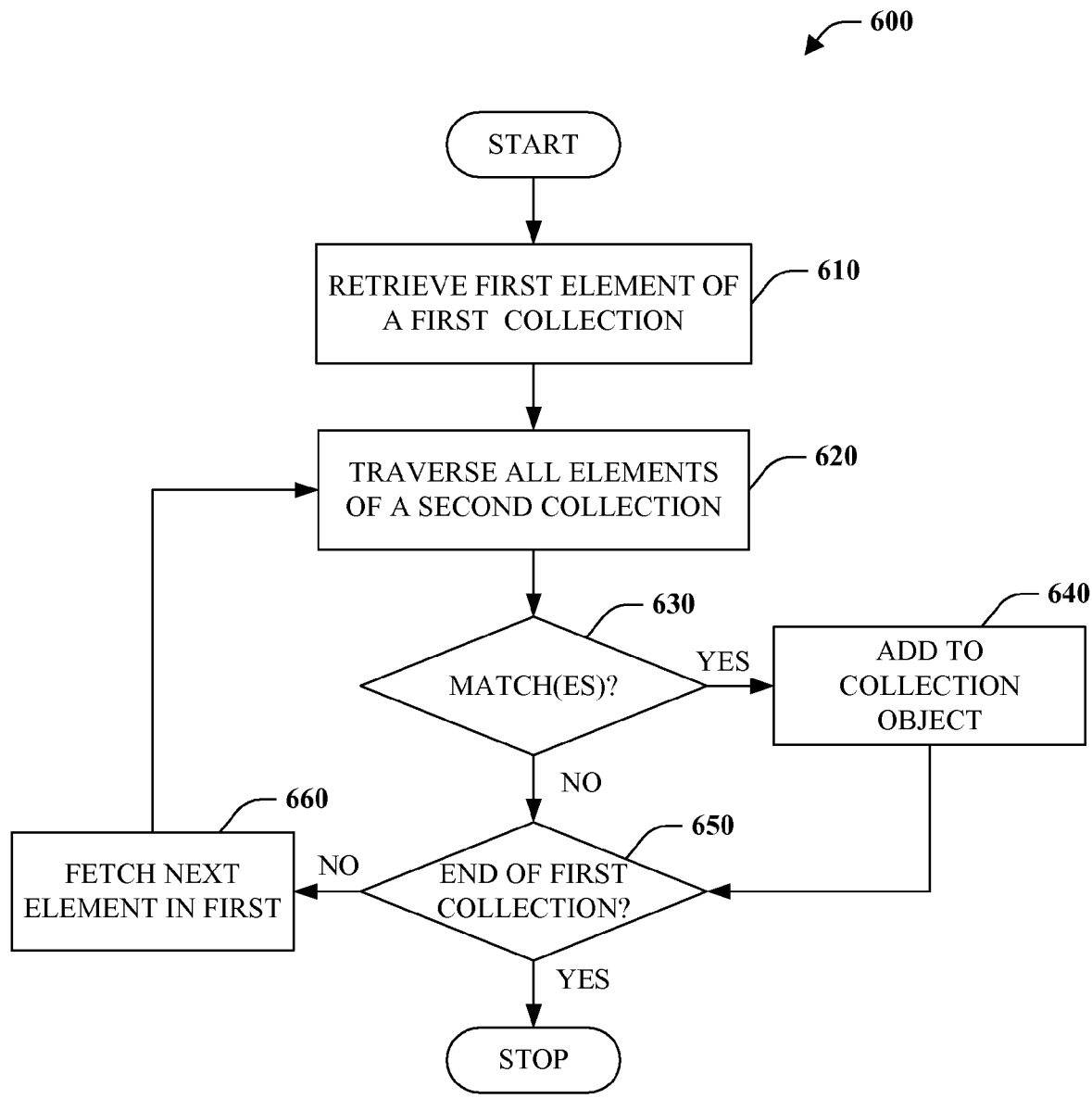
FIG. 6 is a flow chart diagram of a method of joining data collections with a nested loop.

FIG. 6 is a method 600 of joining data with a nested loop. At reference numeral 610, a first element of a first collection of data is retrieved. A second collection of data is traversed at numeral 620. A determination is made at reference numeral 620 as to whether any of the elements of the second collection match the first element. If yes, the elements are added to a collection object at 630. If no or following addition of matching elements to the collection object, a determination is made as to whether all elements of the first collection have been analyzed at numeral 640. In other words, the question concerns whether the end of the first collection has been reached. If yes, the method 600 can simply terminate. The collection object houses nested results. If no, the method 600 proceeds to 660 where the next element in the first collection is fetched, and the method 600 continues at reference numeral 620. This process can continue until all elements of the first collection have been enumerated. Again, at the end a collection object will include the results. In sum, the method 600 corresponds to a nested loop implementation of a group join where the second collection is traversed for each element of the first collection.

Figure 7:
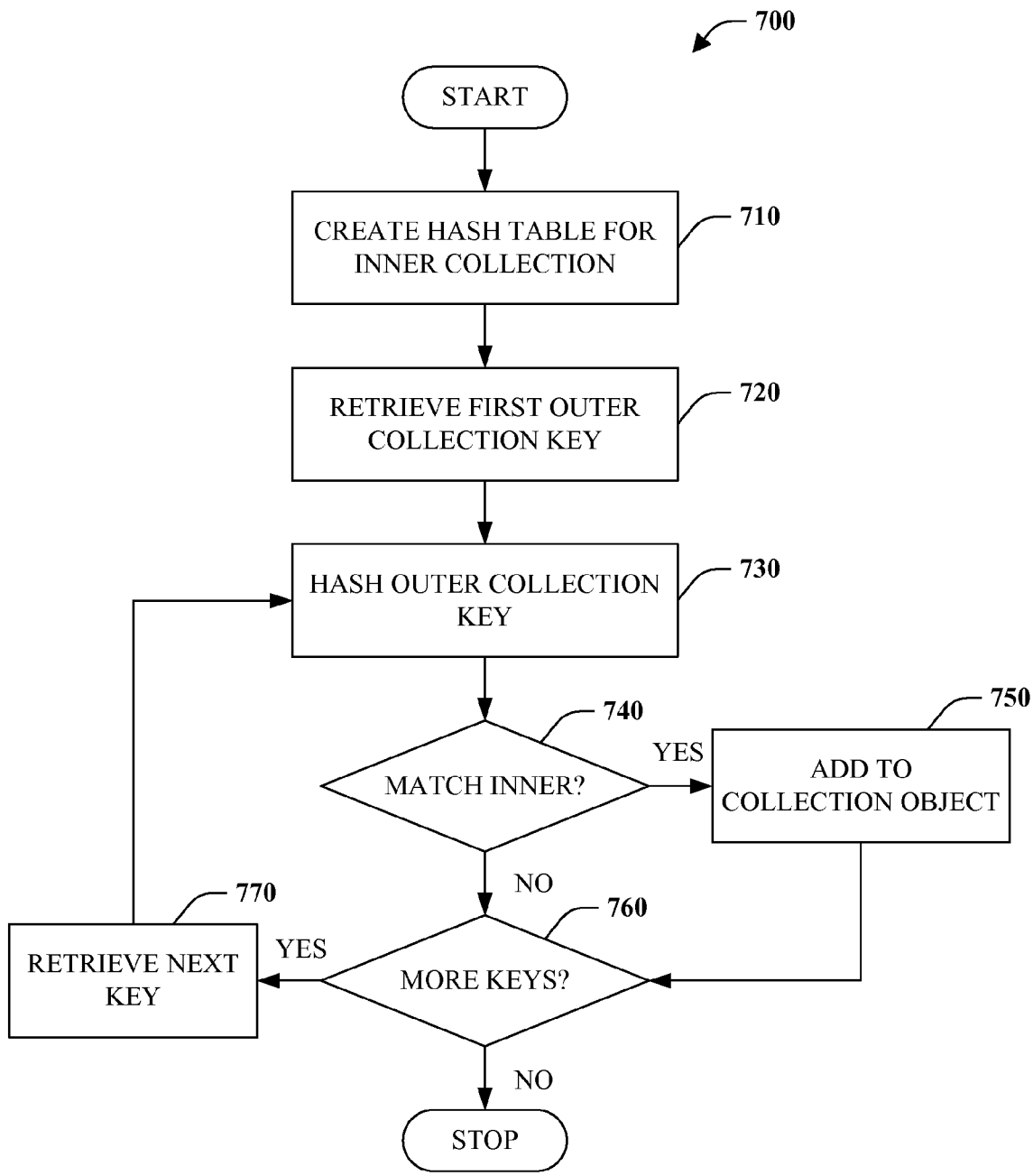
FIG. 7 is a flow chart diagram of a method of joining data collections with a hash function.

FIG. 7 is a flow chart diagram of a method 700 of joining data utilizing a hash function. At reference numeral 710, a hash table is created of elements of an inner collection. The hash table comprises collections of one or more elements mapping to a particular key or more particularly a hash of the key. At numeral 720, a first outer collection key is retrieved. A hash function is applied to the key at 730. A determination is made at 740 as to whether there is a matching inner element. This can include comparing the hashed key to a record index in the hash table of inner elements. If there is a match, outer element(s) corresponding to the hash key and the collection of inner elements can be added to a collection object. It should also be noted that even if there is not a match, the outer element(s) corresponding to the hash key can be added to the collection object associated with an empty set. At reference numeral 760, a decision is made as to whether there are more keys to analyze. That is, whether or not the entire outer collection has been traversed. If no, the method 700 terminates and the current state of the collection object represents the result(s). However, if there are more keys to analyze, then the method 700 continues at 770 where the next key is retrieved and subsequently hashed at reference 730. The method 700 continues to loop until all keys of the outer collection have been traversed. This join methodology is more efficient than the nested loop approach of method 600 at least because elements of collections need not be run over multiple times.

Figure 8:
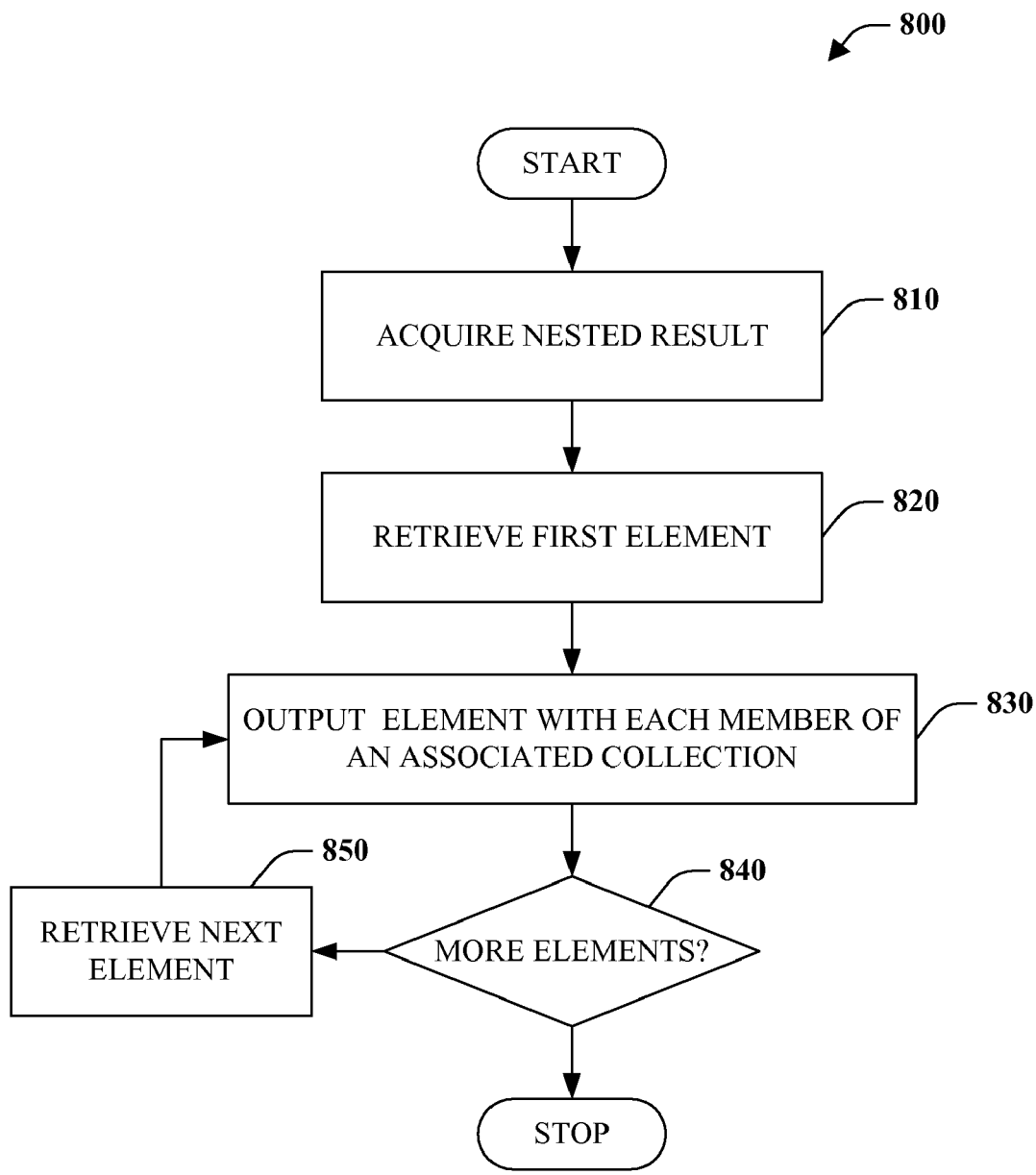
FIG. 8 is a flow chart diagram of a method flattening nested data.

Turning to FIG. 8, a method 800 of flattening nested data is illustrated in accordance with an aspect of this disclosure. At reference numeral 810, nested or hierarchical data is acquired such as that produced as a result of a group join operation. The first element is retrieved at 820. At numeral 830, the first element is output with each member of a collection associated with the first element. Stated differently, the first element is duplicated for each associated set element. Where the set is empty, a designated value can be inserted including without limitation a null value. At numeral 840, a determination is made as to whether there are more elements. If yes, the method 800 proceeds to 850 where the next element is retrieved and then back to reference numeral 830. The method 800 can continue to loop until all elements of the nested data are navigated. The result is a flattened output such as that associated with conventional database tables.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
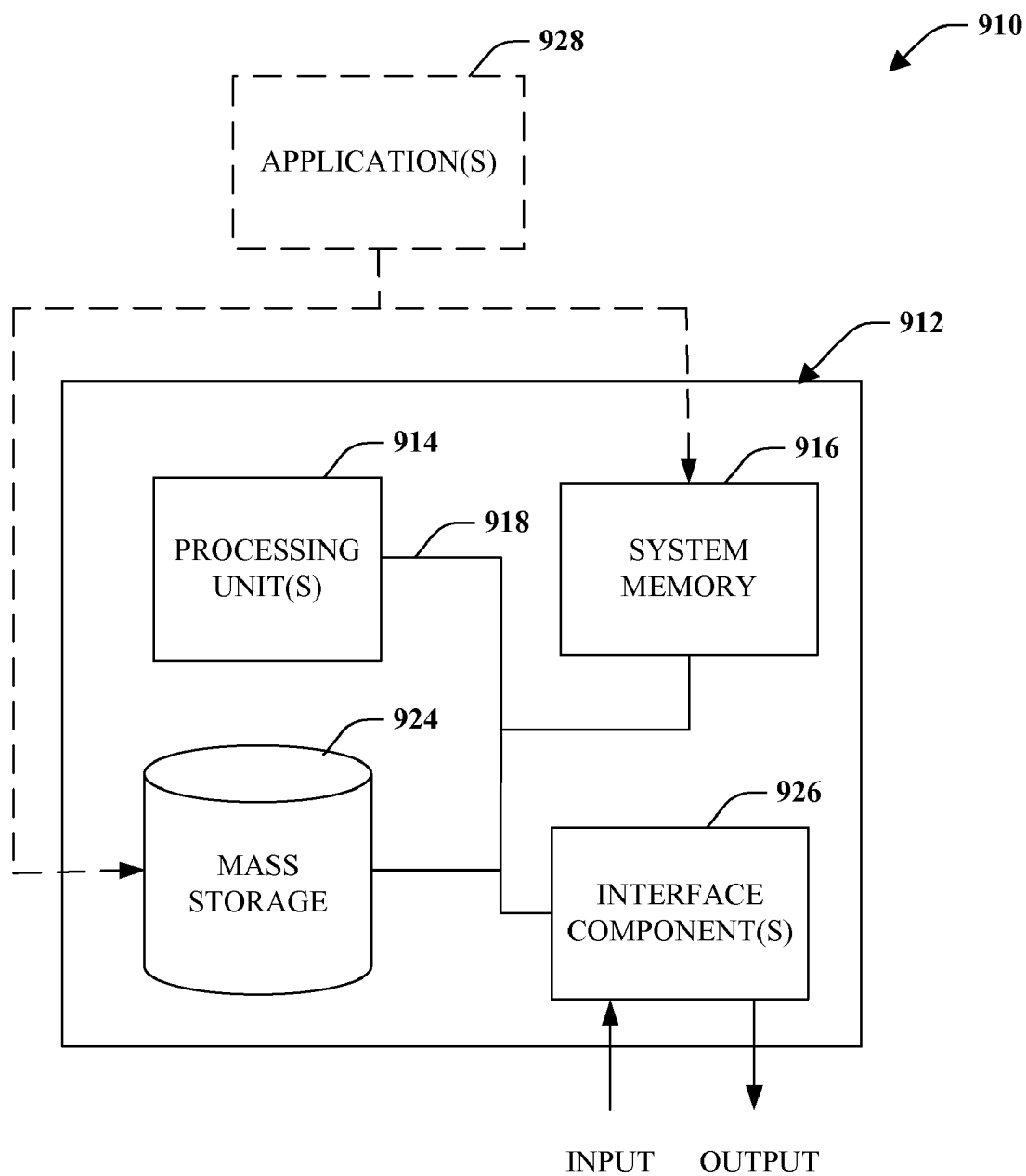
FIG. 9 is a schematic block diagram illustrating a suitable operating environment for aspects of the subject disclosure.
Figure 10:
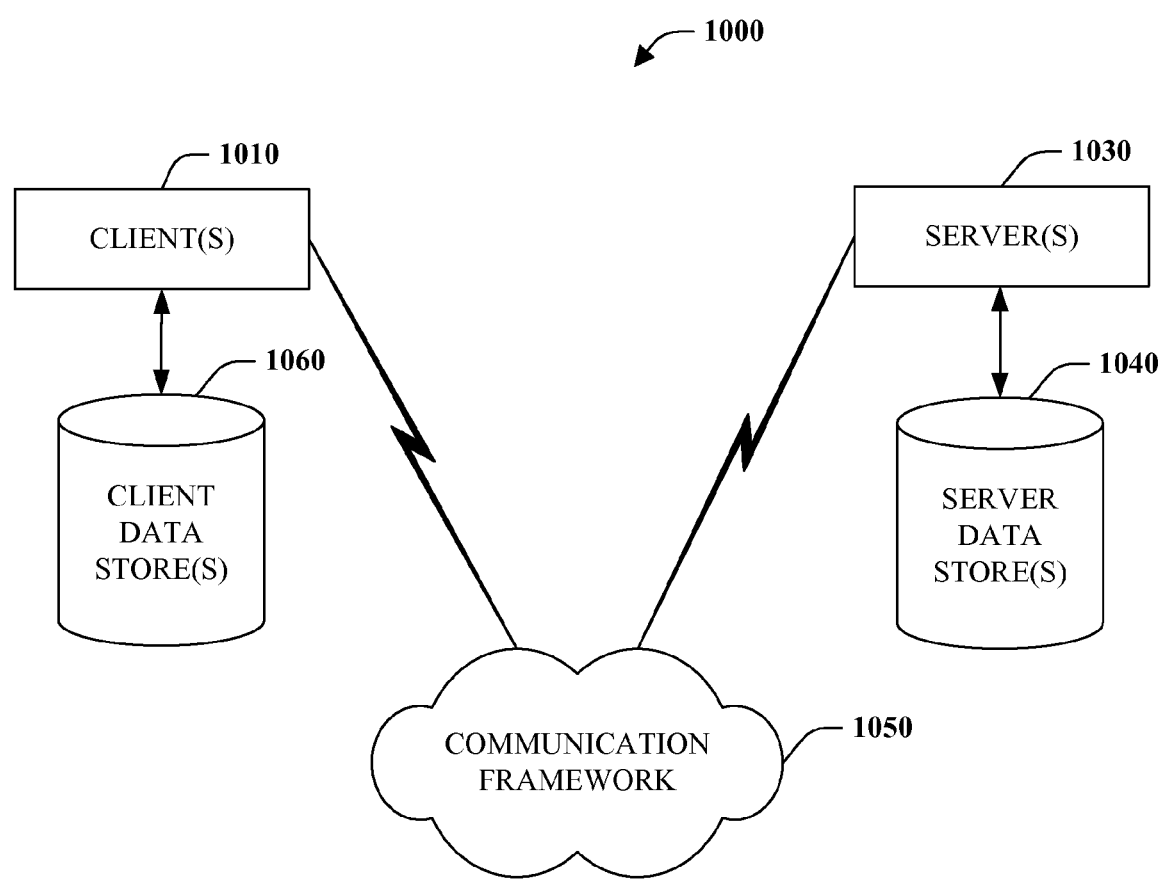
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 910 for implementing various aspects disclosed herein includes a computer 912 (e.g., desktop, laptop, server, hand held, programmable consumer or industrial electronics . . . ). The computer 912 includes a processing unit 914, a system memory 916 and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/nonvolatile computer storage media. FIG. 9 illustrates, for example, mass storage 924. Mass storage 924 includes, but is not limited to, devices like a magnetic or optical disk drive, floppy disk drive, flash memory or memory stick. In addition, mass storage 924 can include storage media separately or in combination with other storage media.

FIG. 9 provides software application(s) 928 that act as an intermediary between users and/or other computers and the basic computer resources described in suitable operating environment 910. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030. For example, programmers on client(s) 1010 utilize a group join to query data housed by server(s) 1030 or more specifically server data store(s) 1040. In one particular instance, a group join query can be transmitted over the communication framework 1050 from a client 1010 to a server 1030 as an expression tree or other representation for execution by the server 1030.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A data retrieval system, comprising:
a processor;
a component implemented by the processor that acquires a plurality of data collections, wherein the data collections are specified in accordance with a nested or hierarchical data model;
a join component configured to allow remote execution by a user that performs the following:
identifies a group join query from a query syntax, wherein the group join query comprises a query that is directed to at least two different data collections, the group join query being configured to combine data rows of the different data collections, the group join query comprising a group join operator that allocates and returns an enumerable object that captures one or more arguments passed to the group join operator, wherein the arguments specify functions that extract join key values from elements of both outer and inner sequences, and wherein a hash join is employed to combine the data of the two different data collections;
traverses the plurality of data collections to locate and combine data across the collections that satisfy one or more group join arguments of a query, wherein the data is automatically made available to the join component based on the group join arguments and wherein the join component preserves the order of any outer sequence elements and, for each outer sequence element, preserves the order of any matching inner sequence elements, wherein the traversal includes implementing a superset of inner joins and left outer joins which are each written in terms of grouped joins; and
based on the traversal, returns a hierarchical result;
a hash component that executes a hash join function over join keys of both the inner and the outer sequences, wherein the hash join modifies the group join to increase group join performance by combining outer and inner sequence elements;
an identifier component that discovers and identifies abbreviated queries among the group queries, wherein a join is inferred from the abbreviated query syntax; and
a translation component that receives identification information from the identifier component identifying abbreviated code and translates the abbreviated code into an expanded format for implementation by the join component.

2. The system of claim 1, one or more nested loops are employed by the join component to combine the data.

3. The system of claim 1, further comprising a presentation component that flattens the hierarchical result.

4. The system of claim 3, the presentation component inserts into the query another query including an operator that injects a value for missing values.

5. The system of claim 1, the query is a language integrated query expression.

6. The system of claim 5, the data collections are structured in accordance with an object-oriented data model.

7. The system of claim 6, the data collections are acquired from memory or an external source.

8. The system of claim 1, the join component performs an outer join.

9. A method of traversing data collections, comprising:
acquiring a query identifying a one to many relationship amongst an inner and outer data collection, wherein the inner and outer data collections are specified in accordance with a nested or hierarchical data model;
identifying a group join query from a query syntax, wherein the group join query comprises a query that is directed to at least two different data collections, the group join query being configured to combine data rows of the different data collections, the group join query comprising a group join operator that allocates and returns an enumerable object that captures one or more arguments passed to the group join operator, wherein the arguments specify functions that extract join key values from elements of both outer and inner sequences, and wherein a hash join is employed to combine the data of the two different data collections;
traversing the plurality of data collections in accordance with the query to locate and combine data across the collections that satisfy one or more group join arguments of a query, wherein the data is automatically made available to the join component based on the group join arguments and wherein the join component preserves the order of any outer sequence elements and, for each outer sequence element, preserves the order of any matching inner sequence elements, wherein the traversal includes implementing a superset of inner joins and left outer joins which are each written in terms of grouped joins;
executing a hash join function over join keys of both the inner and the outer sequences, wherein the hash join modifies the group join to increase group join performance by combining outer and inner sequence elements;
identifying one or more abbreviated queries among the group queries, wherein a join is inferred from the abbreviated query syntax;
receiving identification information identifying abbreviated code portions and translating the abbreviated code into an expanded format for implementation by the join component;
based on the traversal and the translated code, returning selected data in a nested format.

10. The method of claim 9, further comprising identifying join keys for each data collection.

11. The method of claim 10, further comprising collecting elements of the inner collection by their keys in a hash table.

12. The method of claim 11, further comprising:
generating a hash key for each element of the outer collection as a function of the associated join key; and
looking up corresponding inner elements in the hash table with the hash key.

13. The method of claim 9, further comprising flattening the nested results.

14. The method of claim 13, comprising inserting into the query another query including an operator that injects a value for missing values.

15. The method of claim 9, further comprising performing an inner join.

16. The method of claim 9, further comprising performing an outer join.

17. A system to navigate relationships amongst data collections, comprising:
- a processing means;
- a memory means;
- means for receiving a language integrated query expression, wherein language integrated query expression is configured to query a plurality of data collections that are specified in accordance with a nested or hierarchical data model;
- means for identifying a group join query from a query syntax, wherein the group join query comprises a query that is directed to at least two different data collections, the group join query being configured to combine data rows of the different data collections, the group join query comprising a group join operator that allocates and returns an enumerable object that captures one or more arguments passed to the group join operator, wherein the arguments specify functions that extract join key values from elements of both outer and inner sequences, and wherein a hash join is employed to combine the data of the two different data collections;
- means for traversing the plurality of the plurality of data collections to locate and combine data across the plurality of data collections in accordance with the query expression, to satisfy one or more group join arguments of the query expression, wherein the data is automatically made available to the join component based on the group join arguments and wherein the join component preserves the order of any outer sequence elements and, for each outer sequence element, preserves the order of any matching inner sequence elements, wherein the traversal includes implementing a superset of inner joins and left outer joins which are each written in terms of grouped joins;
- means for executing a hash join function over join keys of both the inner and the outer sequences, wherein the hash join modifies the group join to increase group join performance by combining outer and inner sequence elements;
- means for identifying one or more abbreviated queries among the group queries, wherein a join is inferred from the abbreviated query syntax; means for receiving identification information identifying abbreviated code portions and translating the abbreviated code into an expanded format for implementation by the join component; and
- means for returning a nested result based on the traversal and the translated code.

18. The system of claim 17, further comprising a means for flattening the nested result to simulate relational database results.

* * * * *